United States Patent [19]

Konrad et al.

[11] Patent Number: 4,845,176

[45] Date of Patent: Jul. 4, 1989

[54] PREPARATION OF HOMOPOLYMERS AND COPOLYMERS OF ETHENE USING A CHROMIUM TRIOXIDE CATALYST

[75] Inventors: Rainer Konrad, Goennheim; Rainer Hemmerich, Gruenstadt; Rudolf Mueller-Mall, Neuhofen; Guenther Schweier, Friedelsheim, all of Fed. Rep. of Germany

[73] Assignee: BASF Aktiengsellschaft, Ludwigshafen, Fed. Rep. of Germany

[21] Appl. No.: 105,542

[22] Filed: Oct. 8, 1987

[30] Foreign Application Priority Data

Oct. 10, 1986 [DE] Fed. Rep. of Germany ....... 3634534

[51] Int. Cl.$^4$ .......................... C08F 4/24; C08F 10/02
[52] U.S. Cl. ..................... 526/105; 502/117; 526/106; 526/908; 526/909
[58] Field of Search ......................................... 526/105

[56] References Cited

U.S. PATENT DOCUMENTS

| | | | |
|---|---|---|---|
| 2,887,471 | 5/1959 | Shearer et al. | 526/105 |
| 3,277,070 | 10/1966 | Weynbergh et al. | 526/105 |
| 4,037,042 | 7/1977 | Mueller-Tamm et al. | 526/106 |
| 4,042,770 | 8/1977 | Bachl et al. | 526/106 |
| 4,110,522 | 8/1978 | Frielingsdorf et al. | 526/106 |
| 4,727,124 | 2/1988 | Konrad et al. | 526/105 |
| 4,728,703 | 3/1988 | Konrad et al. | 526/105 |

FOREIGN PATENT DOCUMENTS

| | | | |
|---|---|---|---|
| 3329015 | 2/1985 | Fed. Rep. of Germany | 526/106 |
| 3329016 | 2/1985 | Fed. Rep. of Germany | |

*Primary Examiner*—Edward J. Smith
*Attorney, Agent, or Firm*—Keil & Weinkauf

[57] ABSTRACT

Ethene homopolymers and ethene copolymers with minor amounts of higher α-monoolefins are prepared by polymerization of the monomer or monomers using a chromium trioxide catalyst which is obtained by a method in which (1) a finely divided, porous, silicate carrier is laden with (2) chromium trioxide or a chromium compound which is converted to chromium trioxide under the conditions of stage (3), and then (3) the intermediate resulting from stage (2) is heated in an oxygen-containing gas stream. In this process, a cocatalyst which consists of a lithiumalkyl used in addition to the chromium trioxide catalyst.

1 Claim, No Drawings

PREPARATION OF HOMOPOLYMERS AND COPOLYMERS OF ETHENE USING A CHROMIUM TRIOXIDE CATALYST

The present invention relates to a process for the preparation of ethene homopolymers and ethene copolymers with minor amounts of copolymerized $C_3$–$C_{12}$-α-monoolefins, in particular $C_3$–$C_8$-α-monoolefins, by polymerization of the monomer or monomers at from 30° to 150° C., in particular from 60° to 120° C., and under from 2 to 150, in particular from 5 to 60, bar using a chromium trioxide catalyst which is obtained if (1) a finely divided, porous carrier consisting of silica or based on silica (2) is laden with chromium trioxide, or a chromium compound which is converted to chromium trioxide under the conditions of stage (3), in a weight ratio of carrier to chromium of from 100:0.1 to 100:10, in particular from 100:0.3 to 100:3, and then (3) the intermediate resulting from stage (2) is kept at from 400° to 1,100° C., in particular from 700° to 950° C., for from 10 to 1,000, in particular from 60 to 300, minutes in an anhydrous gas stream containing oxygen in a concentration of more than 10% by volume.

In this process, it is important that fluctuations in productivity, i.e. in the yield of polymer, based on the amount of catalyst used, as may result from impurities in the starting materials, are substantially avoided, since these fluctuations affect the properties of the polymer in an undesirable and uncontrollable manner. Furthermore, it is desirable to set the molecular weight of the polymer according to the desired property profile of the finished articles and independently of the productivity, a requirement which cannot be satisfactorily met owing to the known dependence of the productivity and of the regulatability of the molecular weight on the activation temperature in the case of chromium tioxide catalysts and the known poor regulatability of the molecular weight with hydrogen. Finally, the induction time required before the beginning of the polymerization for reduction of the chromium trioxide catalyst, and the sensitivity of the catalyst to impurities in the starting materials, may lead to difficulties in starting up polymerization reactors.

It is known that, by using organoaluminum compounds, such as dialkylaluminum alkoxides or alumoxanes, as cocatalysts in the polymerization with chromium trioxide catalysts, it is possible both to achieve a substantially constant and generally higher productivity and sufficiently to influence the molecular weight by means of hydrogen.

Typical processes of this type are described in, for example, German Laid-Open Applications DOS 3,329,015 and DOS 3,329,016.

These processes, like other comparable polymerization processes, have the disadvantage that the resulting polymers possess unfavorable morphological properties, for example a high dust content or a low bulk density, which may be disadvantageous with regard to technical control of the polymerization systems, working up of the polymers and/or the processability of the polymers.

It is an object of the present invention to develop the process defined at the outset, which employs a chromium trioxide catalyst, so that polymers having suitable morphological properties and very high to average molecular weights which can be regulated by hydrogen can be prepared with the same high productivity, and trouble-free starting of the polymerization in the reactor is made possible.

We have found that this object is achieved if the process under discussion is carried out with the additional use of a lithium-alkyl as cocatalyst.

The present invention accordingly relates to a process for the preparation of ethene homopolymers and ethene copolymers with minor amounts of copolymerized $C_3$–$C_{12}$-α-monoolefins, in particular $C_3$–$C_8$-α-monoolefins, by polymerization of the monomer or monomers at from 30° to 150°C., in particular from 60° to 120° C., and under from 2 to 150, in particular from 5 to 60, bar using a chromium trioxide catalyst which is obtained if (1) a finely divided, porous carrier consisting of silica or based on silica (2) is laden with chromium trioxide, or a chromium compound which is converted to chromium trioxide under the conditions of stage (3), in a weight ratio of carrier to chromium of from 100:0.1 to 100:10, in particular from 100:0.3 to 100:3, and then (3) the intermediate resulting from stage (2) is kept at from 400° to 1,100° C., in particular from 700° to 950° C., for from 10 to 1,000, in particular from 60 to 300, minutes in an anhydrous gas stream containing oxygen in a concentration of more than 10% by volume.

In the novel process, in addition to the chromium trioxide catalyst, a cocatalyst is used which consists of a lithiumalkyl of the formula LiR, where R is $C_2$–$C_6$-alkyl, in particular $C_2$–$C_4$-alkyl, especially n-butyl, sec-butyl or tert-butyl, with the proviso that the atomic ratio of chromium in the chromium trioxide catalyst to lithium in the cocatalyst is from 1:0.05 to 1:100, in particular from 1:0.1 to 1:50.

We have found that the novel process can be carried out particularly successfully if a chromium trioxide catalyst is used which is based on a carrier (1) which is obtained by a method in which (1.1) a silica hydrogel containing from 10 to 25, preferably from 12 to 20, in particular from 14 to 20, % by weight of solid (calculated as silica) is used as a starting material, the said hydrogel being substantially spherical, having a particle diameter of from 1 to 8 mm, in particular from 2 to 6 mm, and being obtained by a method in which (1.1.1) a sodium or potassium waterglass solution is introduced into a stream of an aqueous mineral acid subjected to angular momentum, the introduction being carried out along or tangentially to the stream, (1.1.2) the resulting silica hydrosol is sprayed in the form of drops into a gaseous medium, (1.1.3) the sprayed hydrosol is allowed to solidify to the hydrogel in the gaseous medium, and (1.1.4) the resulting substantially spherical hydrogel is freed from salts by washing, without prior aging, (1.2) not less than 60%, in particular not less than 90%, of the water present in the hydrogel is extracted from the hydrogel (1.1) by means of an organic liquid from the series consisting of the $C_1$–$C_4$-alkanols and/or $C_3$–$C_5$-alkanones, (1.3) the resulting dewatered gel treated with the organic liquid is dried until there is no longer any weight loss at 180° C. under a reduced pressure of 10 mm Hg in the course of 30 minutes (xerogel formation) and (1.4) the xerogel thus obtained is converted to particles having the desired diameter.

We have also found that the novel process can likewise be carried out particularly successfully if a chromium trioxide catalyst is used which is based on a carrier (1) which is obtained by a method in which, in the second stage (2), the carrier is laden with the required amount of chromium, with evaporation of the solvent, from a 0.05–5% strength by weight solution of chromium trioxide in a $C_3$–$C_5$-alkanone or from a 0.05–15% strength by weight solution of a chromium compound which is converted to chromium trioxide under the conditions of stage (3), in a $C_1$–$C_4$-alkanol, the relevant solvent being permitted to contain no more than 20, preferably no more than 5, % by weight of water.

Finally, we have found that the optimum chromium trioxide catalyst for carrying out the novel process successfully is one which is based o the abovementioned, specially prepared carrier (1), which in turn is laden stage (2) in the special manner described above. The relevant polymerization process is described in U.S. Pat. No. 4,037,042 and is hereby incorporated by reference.

Regarding the chromium trioxide catalyst to be used in the novel process, the following may be stated specifically.

The catalyst may be a relevant conventional one for the polymerization of α-monoolefins and in this respect need not have any special features. Such catalysts are commercially available; they are advantageously based on a carrier (1) which consists of silica which may contain up to 15% by weight of one or more oxides of the elements aluminum, titanium, zirconium, molybdenum or vanadium.

In the present invention, it is preferable to use a chromium trioxide catalyst which is based on a carrier (1) which, as outlined above, is obtained in four stages (1.1) to (1.4).

Regarding these stages, the following may be stated:
(1.1) the typical feature of this stage is the use of a silica hydrogel which has a relatively high solids content, is substantially spherical and, in particular, has been prepared by a special method. This special preparation method is described in detail in its substages (1.1.1), (1.1.2) and (1.1.3), for example in U.S. Pat. No. 3,872,217; the same substages and in addition the substage (1.1.4) are described in, for example, U.S. Pat. No. 4,037,042. The disclosures of the two stated patents in this respect are hereby incorporated by reference, so that relevant detailed description can be dispensed with here.

(1.2) The extraction of the water from the silica hydrogel by means of the organic liquid stated above can be carried out in a conventional extraction apparatus. Suitable apparatuses are, for example, column extractors. From the series consisting of the alkanols, the following organic liquids have proven useful (arranged in order of decreasing efficiency, although not in order of decreasing cost-effectiveness): tert-butanol, isopropanol, ethanol and methanol. From the series consisting of the alkanones, which are generally preferable to the alkanols, acetone has proven particularly useful. Of course, the organic liquid may consist of one or more of the suitable individual liquids; in any case, the liquid should contain less than 5, preferably less than 3, % by weight of water before the extraction.

(1.3) The conversion of the gel treated with organic liquid into the xerogel (drying) can once again be carried out in a relevant conventional drying apparatus. The best results are obtained if drying is carried out at a product temperature of from 80° to 200° C. and under from 1 to 250 mmHg, vapor pressure considerations making it necessary to increase the pressure with increasing temperature and vice versa. The drying process, particularly under relatively high pressures, can be accelerated by a stream of entraining gases, for example nitrogen.

(1.4) The production of xerogel particles having a certain diameter does not in principle have any special features. It can be carried out, for example, in a simple manner by milling the product obtained from stage (1.3) and fractionating it by sieving.

The manner in which the carrier (1) is laden, in the second stage (2) of catalyst preparation, with chromium trioxide or a chromium compound which is converted to chromium trioxide under the conditions of stage (3) is not generally critical, i.e. the carrier may be laden in a relevant conventional manner. For the purposes of the present invention, however, a preferred catalyst is one where the carrier has been laden in the special manner described above.

In this special method of loading, it is advantageous if the carrier (1) is suspended in a solution of chromium trioxide or of a chromium compound which is converted to chromium trioxide under the conditions of stage (3) (the amounts being chosen so that the desired ratio of carrier to chromium is obtained) and the liquid constituents of the mixture, i.e. the alkanone or alkanol and any water, are evaporated off with continuous, very homogeneous mixing of the batch. It is most advantageous to carry out this procedure at from 20° to 150° C. and under from 10 to 760 mmHg. It is not critical if the carrier laden with the chromium component still contains a certain amount of residual moisture (not more than 20, in particular not more than 10, % by weight, based on the carrier, of volatile constituents). Chromium components which are suitable in the present context are, in particular, chromium trioxide and chromium hydroxide, as well as soluble salts of trivalent chromium with an organic or inorganic acid, such as the acetate, oxalate, sulfate or nitrate; particularly suitable salts are salts of such acids which, when activated, are converted to chromium trioxide without leaving any residue. Chromium compounds in the form of chelates, e.g. chromium acetylacetonate, can also be used.

The third stage (3) of the preparation of the chromium trioxide catalyst serves for activating the said catalyst; the stage can be carried out in a relevant conventional manner which is well known from the literature and in practice, i.e. in particular under conditions which ensure that some, if not all, of the chromium is present in the hexavalent state in the ready-prepared catalyst.

The defining feature of the novel process is the fact that the chromium trioxide catalyst described above and known per se is employed in the presence of a lithium-alkyl of the formula defined above, as a cocatalyst.

Specific examples of particularly useful cocatalysts of the stated type are n-butyllithium, sec-butyllithium and tert-butyllithium.

Finally, regarding the novel process as a whole, the following may be stated.

Provided that the defining feature is observed, the polymerization process as such can be carried out in virtually any relevant conventional technological embodiment, for example as a batchwise, periodic or continuous suspension polymerization process or dry phase polymerization process. Stated technological embodiments, i.e. the technological variants of the polymerization of olefins by the Phillips method, are well known from the literature and in practice, so that further description is superfluous. All that need be noted is that the catalysts may be combined with the cocatalysts outside or inside the polymerization vessel, in the last-mentioned case, for example, by introducing the components at different points; otherwise, the said components can be handled in the form of a suspension (catalyst) or solution (cocatalyst).

It should also be stated that the novel process is mainly suitable for the preparation of homopolymers of ethene or copolymers of ethene with α-monoolefins, such as propene, but-1-ene, hex-1-ene, 4-methylpent-1-ene and oct-1-ene, having a very high to average molecular weight which can be regulated by hydrogen, a low content of fine dust and a high bulk density, in high yield based on the amount of catalyst used (high productivity), i.e. polymers as used in particular, for example, in the blow molding process. In the novel process, the polymerization in the reactor starts particularly readily.

EXAMPLE 1

Preparation Of The Carrier (Xerogel)

A mixing nozzle shown in FIG. 1 of U.S. Pat. No. 3,872,217 and having the following data was used. The diameter of the cylindrical mixing chambers formed from a plastic tube was 14 mm and the length of the mixing chamber (including after-mixing zone) was 350 mm. A tangential inlet hole of 4 mm diameter for the mineral acid was located near the inlet side of the mixing chamber, this side being closed at the end. This was followed by four further holes, likewise having a diameter of 4 mm and the same inlet direction, for the water-glass solution, the distance between the holes being 30 mm, measured in the longitudinal direction of the mixing chamber. Accordingly, the ratio of length to diameter for the primary mixing zone was about 10. For the connected secondary mixing zone, this ratio was 15. A flattened, slightly kidney-shaped piece of pipe was pushed over the outlet end of the plastic tube as a spray nozzle.

This mixing apparatus was charged with 325 l/h of 33% strength by weight sulfuric acid at 20° C. under an operating pressure of about 3 bar and 1,100 l/h of waterglass solution (prepared from technical-grade water-glass containing 27% by weight of $SiO_2$ and 8% by weight of $Na_2O$ by dilution with water) having a density of 1.20 kg/l and likewise at 20° C. and under a pressure of about 3 bar. In the mixing chamber lined with the plastic tube, an unstable hydrosol having a pH of from 7 to 8 was formed by progressive neutralization. The said hydrosol remained in the after-mixing zone for about a further 0.1 second until homogenization was complete, and was then sprayed through the nozzle mouthpiece as a flat liquid jet into the atmosphere. During its flight through the air, the jet divided into individual drops which were converted to a substantially spherical form owing to the surface tension and solidified during their flight, in the course of about 1 second, to give hydrogel spheres. The spheres had a smooth surface, were transparent, contained about 17% by weight of $SiO_2$ and had the following particle size distribution:

| | |
|---|---|
| >8 mm | 10% by weight |
| 6–8 mm | 45% by weight |
| 4–6 mm | 34% by weight |
| <4 mm | 11% by weight |

At the end of their flight, the hydrogel spheres were collected in a washtower which was virtually completely filled with hydrogel spheres and in which the spheres, without being aged, were immediately washed salt-free with slightly ammoniacal water at about 50° C. in a continuous countercurrent process.

Spheres which had a diameter of from 2 to 6 mm were isolated by sieving, and 112 kg of these spheres were introduced into an extraction vessel having a feed at the top, a perforated bottom and a swan-neck overflow which was connected to the bottom of the vessel and kept the liquid level in the vessel at a height such that the hydrogel spheres were completely covered with liquid. Ethanol was then run in at a rate of 60 l/h until the density of the ethanol/water mixture emerging from the overflow had fallen to 0.826 g/cm$^3$; at this point, about 95% of the water present in the hydrogel had been extracted.

The resulting spheres were dried at 180° C. under reduced pressure of 10 mmHg for 8 hours; thereafter, there was no longer any weight loss under the stated conditions in the course of 30 minutes.

The dried spheres were then milled, and the xerogel particles having diameters of 250–300 μm were isolated by sieving.

Preparation Of The Catalyst 15 kg of the xerogel described above and 40 liters of a roughly 1% strength by weight solution of chromium trioxide in acetone were introduced into a double-cone mixer. The acetone was then distilled off under reduced pressure from a water jet and with rotation of the mixer, which was heated externally with steam to 110° C.

The resulting product was heated at 890° C. for 4 hours in a fluidized bed through which air was flowing, and was then cooled again. Below 140° C., the fluidized bed was flushed with nitrogen in order to eliminate traces of oxygen (which present problems during the polymerization).

The catalyst thus obtained had an analytically determined chromium content of about 0.0002 mol/g.

Polymerization

The procedure was carried out in a 10 l pressure autoclave which was heated to 102° C. and flushed several times with ethene. 5 l of isobutane and 5 ml of a solution containing 10 g of n-butyllithium per l of n-heptane were then introduced, while stirring. When the desired reaction temperature of 102° C. had been reached, 270 mg of the catalyst described above were forced in by means of nitrogen so that the pressure in the autoclave before the addition of ethene was 25 bar. The selected atomic ratio of chromium in the catalyst to lithium in the cocatalyst was accordingly 1:15.

Ethene was then forced in until the total pressure was 42 bar, and further ethene was forced in as the polymerization progressed, at constant reaction temperature, in the pressure range from 40 to 42 bar. The polymerization was stopped after a reaction time of 90 minutes by letting down the autoclave.

1,580 g of grit-like polymer were obtained, corresponding to a productivity of 5,850 g of polyethylene per g of catalyst.

The polyethylene had the following characteristic data:

| | |
|---|---|
| HL melt index (HLMI 190° C./21.6 kp, according to DIN 53,735) | 10.9 g/10 min |
| Limiting viscosity [η] (according to DIN 53,733) | 2.9 dl/g |
| Bulk density (according to DIN 53,468) | 395 g/l |
| Fine fractions <125 μm (by sieve analysis) | 0.2% |

COMPARATIVE EXPERIMENT 1

The procedure was carried out in the same manner as that described in Example 1 (also with regard to the measurement of the characteristic data), with the only exception that the cocatalyst used was diethylaluminum ethoxide. The atomic ratio of chromium in the catalyst to aluminum in the cocatalyst was chosen to be the same as that in Example 1.

This procedure gave 930 g of a polymer having the following characteristic data:

| | |
|---|---|
| HL melt index | 15.9 g/10 min |
| Limiting viscosity [η] | 2.8 dl/g |
| Bulk density | 170 g/l |
| Fine fractions <125 μm | 1.2% |

Thus, the Comparative Experiment gave a polymer having substantially lower bulk density and a greatly increased content of fine dust (<125 μm).

EXAMPLE 2

The procedure was carried out in the same manner as described in Example 1, with the only exception that, during the preparation of the catalyst, heating was carried out at 750° C. instead of 890° C.

1,320 g of polymer having the following characteristic data were obtained in this manner:

| | |
|---|---|
| HL melt index | 2.7 g/10 min |
| Limiting viscosity [η] | 3.6 dl/g |
| Bulk density | 394 g/l |

EXAMPLE 3

The procedure was carried out in the same manner as in Example 2, with the only exception that, during the polymerization, an additional 10 l of hydrogen was passed in before the ethene was forced in.

1,490 g of polyethylene having the following characteristic data were obtained in this manner:

| | |
|---|---|
| HL melt index | 6.2 g/10 min |
| Limiting viscosity [η] | 3.3 dl/g |
| Bulk density | 473 g/l |

Thus, by adding hydrogen, the HL melt index is more than doubled compared with Example 2.

We claim:

1. In a process for the preparation of ethene homopolymers and ethene copolymers with minor amounts of copolymerized $C_3$-$C_{12}$-α-monoolefins, by polymerization of the monomer or monomers at from 30° to 150° C. and under from 2 to 150 bar using a chromium trioxide catalyst which is obtained by a method in which
   (1) a finely divided, porous carrier obtained by a method in which
      (1.1) a silica hydrogel containing from 10 to 25% by weight of solid (calculated as silica) is used as a starting material, the said hydrogel being substantially spherical, having a particle diameter of from 1 to 8 mm, and being obtained by a method in which
         (1.1.1) a sodium or potassium waterglass solution is introduced into a stream of an aqueous mineral acid subjected to angular momentum, the introduction being carried out along or tangentially to the stream,
         (1.1.2) the resulting silica hydrosol is sprayed in the form of drops into a gaseous medium,
         (1.1.3) the sprayed hydrosol is allowed to solidify to the hydrogel in the gaseous medium, and
         (1.1.4) the resulting substantially spherical hydrogel is freed from salts by washing, without prior aging,
      (1.2) not less than 60% of the water present in the hydrogel is extracted from the hydrogel (1.1) by means of an organic liquid from the series consisting of the $C_1$-$C_4$-alkanols and/or $C_3$-$C_5$-alkanones,
      (1.3) the resulting dewatered gel treated with the organic liquid is dried until there is no longer any weight loss at 180° C. under a reduced pressure of 10 mm Hg in the course of 30 minutes (xerogel formation) and
      (1.4) the xerogel thus obtained is converted to particles having the desired diameter,
   (2) is laden with chromium trioxide, or a chromium compound which is converted to chromium trioxide under the conditions of stage (3), in a weight ratio of carrier to chromium of from 100:0.1 to 100:10, from a 0.05–5% strength by weight solution of chromium trioxide in a $C_3$-$C_5$-alkanone, or a 0.05–15% strength by weight solution of the chromium compound which is converted to chromium trioxide, in a $C_1$-$C_4$-alkanol, the solvent being permitted to contain no more than 20% by weight of water, by evaporation of the solvent, and then
   (3) the intermediate resulting from stage (2) is kept at from 400° to 1,100° C., for from 10 to 1,000 minutes in an anhydrous gas stream containing oxygen in a concentration of more than 10% by volume, the improvement which comprises: using, in addition to the chromium trioxide catalyst, a cocatalyst which consists of a lithiumalkyl of the formula LiR, where R is n-butyl, with the proviso that the atomic ratio of chromium in the chromium trioxide catalyst to lithium in the cocatalyst is from 1:0.05 to 1:100.

* * * * *